United States Patent [19]

Blew et al.

[11] Patent Number: 5,651,081
[45] Date of Patent: Jul. 22, 1997

[54] COMPOSITE FIBER OPTIC AND ELECTRICAL CABLE AND ASSOCIATED FABRICATION METHOD

[75] Inventors: Douglas J. Blew; Bruce J. Carlson; Jana Horska, all of Hickory, N.C.

[73] Assignee: CommScope, Inc., Catawba, N.C.

[21] Appl. No.: 561,044

[22] Filed: Nov. 20, 1995

Related U.S. Application Data

[63] Continuation-in-part of Ser. No. 258,328, Jun. 10, 1994, Pat. No. 5,469,523.

[51] Int. Cl.⁶ .................................................. G02B 6/44
[52] U.S. Cl. ................................................ 385/101; 385/113
[58] Field of Search ............................................ 385/100–114

[56] References Cited

U.S. PATENT DOCUMENTS

| | | | |
|---|---|---|---|
| 1,216,337 | 2/1917 | McCulloch et al. | 174/112 |
| 2,186,788 | 1/1940 | Olson | 174/112 |
| 3,766,307 | 10/1973 | Andrews, Jr. | 385/101 |
| 4,237,337 | 12/1980 | Serrander | 174/10 |
| 4,420,220 | 12/1983 | Dean et al. | 385/111 |
| 4,423,306 | 12/1983 | Fox | 174/112 |
| 4,467,138 | 8/1984 | Brorein | 174/115 |
| 4,469,538 | 9/1984 | Wade et al. | 174/115 |
| 4,729,628 | 3/1988 | Kraft et al. | 350/96.23 |
| 4,770,489 | 9/1988 | Saito et al. | 385/110 |
| 4,815,814 | 3/1989 | Weijasz | 385/101 |
| 4,944,570 | 7/1990 | Oglesby et al. | 385/101 |
| 5,029,974 | 7/1991 | Nilsson | 385/113 |
| 5,109,457 | 4/1992 | Panuska et al. | 385/102 |
| 5,125,063 | 6/1992 | Panuska et al. | 385/113 |
| 5,138,685 | 8/1992 | Arroyo et al. | 385/113 |
| 5,150,443 | 9/1992 | Wijnberg | 385/107 |
| 5,189,718 | 2/1993 | Barrett et al. | 385/101 |
| 5,469,523 | 11/1995 | Blew et al. | 385/101 |

FOREIGN PATENT DOCUMENTS

| | | |
|---|---|---|
| 0040929 | 12/1981 | European Pat. Off. . |
| 2543729 | 10/1984 | France . |
| 3031833A1 | 5/1982 | Germany . |
| 8809330.1 | 8/1989 | Germany . |
| 4142729A | 7/1993 | Germany . |
| 332303 | 7/1930 | United Kingdom . |
| 355087 | 8/1931 | United Kingdom . |
| 474712 | 11/1931 | United Kingdom . |
| 2107896 | 5/1983 | United Kingdom . |
| 2179470 | 3/1987 | United Kingdom . |

*Primary Examiner*—John Ngo
*Attorney, Agent, or Firm*—Bell, Seltzer, Park & Gibson, P.A.

[57] ABSTRACT

A composite fiber optic and electrical cable having a core which loosely contains at least one optical fiber, one or more electrical conductors having an outer polymer insulating layer, one or more strength members and a surrounding protective jacket. The protective jacket is formed of a polymer material which forms a distinct mechanically separate phase from the polymer material forming the insulation layer surrounding the respective electrical conductors. For example, the jacket can be made of a polymer material having a melting temperature lower than the melting temperature of the insulating material of the electrical conductors. As a result, the polymer jacket does not bond with the insulating material during production of the cable. The jacket can, thus, be easily stripped from the electrical conductors during installation of the cable to facilitate the attachment of the electrical conductors to a signal repeater, or power source, or other electrical devices. The cable is manufactured by advancing the core, the electrical conductors and the strength members through an extruder which forms the protective jacket thereabout. The core can be supplied from a storage reel or can be fabricated in-line just prior to extruding the jacket around the buffer tube, the electrical conductors and the strength members, by extruding a buffer tube loosely around the optic fibers.

33 Claims, 3 Drawing Sheets

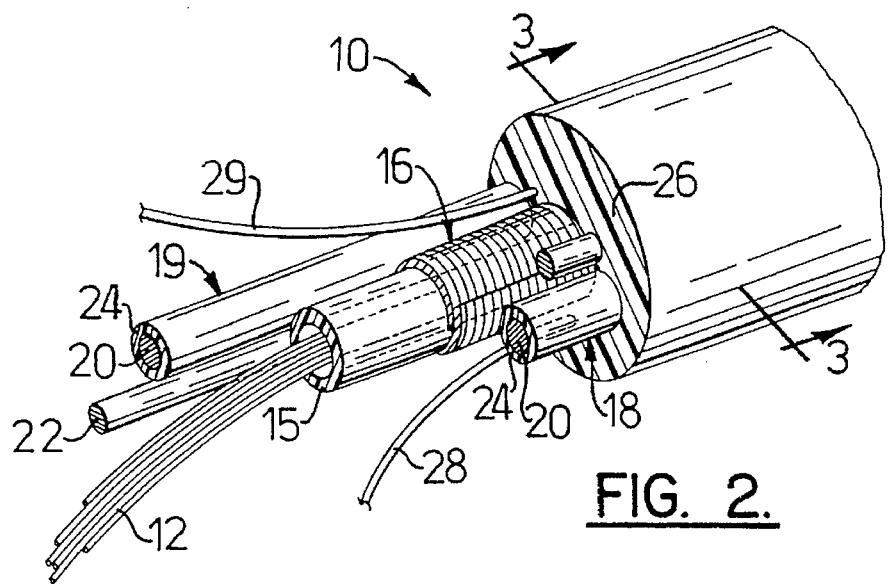
FIG. 2.
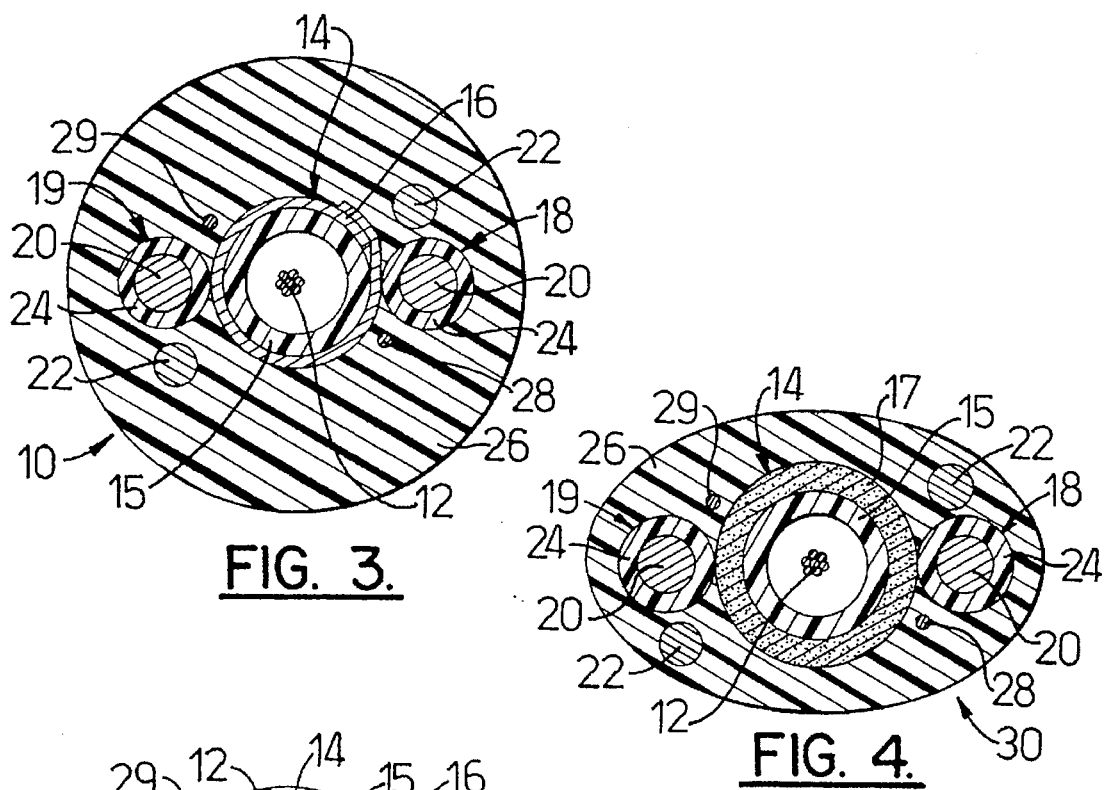
FIG. 3.
FIG. 4.
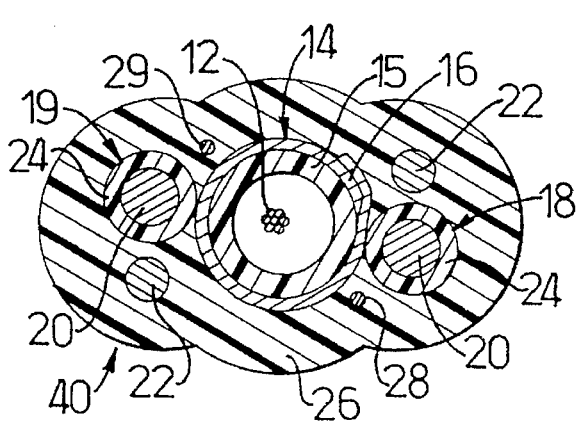
FIG. 5.

COMPOSITE FIBER OPTIC AND ELECTRICAL CABLE AND ASSOCIATED FABRICATION METHOD

RELATED APPLICATION

This application is a continuation-in-part of U.S. patent application Ser. No. 08/258,328 filed Jun. 10, 1994, now U.S. Pat. No. 5,469,523 the contents of which are expressly incorporated in their entirety herein.

FIELD OF THE INVENTION

This invention relates to the field of fiber optic communications systems, and more particularly, to a composite fiber optic and electrical cable with properties which facilitate separation of the electrical components from the cable, and associated fabrication methods.

BACKGROUND OF THE INVENTION

Fiber optic cables are widely used for transmitting telecommunications signals. It is common to produce fiber optic cables for transmitting such signals by surrounding one or more optical fibers within a loose fitting buffer tube in order to isolate the fibers from bending and tensile stresses imparted on the cable. It is also known that the cable may be strengthened by including one or more steel strength members within the cable. In this regard, several prior patents have proposed cables comprising a number of optical fibers disposed loosely within a buffer tube and having at least one strength member outside the buffer tube and incorporated within the cable. For example, U.S. Pat. Nos. 4,420,220 Dean et al., 5,029,974 Nilsson, and 5,138,685 Arroyo et al. disclose such cables.

In circumstances in which telecommunications signals are transmitted over long distances, signal repeaters are oftentimes employed to boost the effective transmission distance of the cable. Conventionally, these signal repeaters are powered by electrical current transmitted via the cable. In an emerging telecommunications architecture, however, fiber optic cables are replacing more traditional copper facilities. In addition, the local telephone company also typically provides power to a subscriber's telephone via the pair of copper wires which also carry the telecommunications signals. Accordingly, it may be desirable to distribute electrical power over a fiber optic cable either directly to a subscriber or to other electronic components, such as signal repeaters, remaining along a copper portion of the network.

It is also known that fiber optic cables can be produced which include electrical conductors in order to supply power to signal repeaters or other electronic components. The electrical conductors can also be used to carry communication messages themselves. For example, U.S. Pat. No. 5,189,718 to Barrett et al. discloses the use of electrical conductors in conjunction with a fiber optic cable wherein the electrical conductors are contained within a separate tube attached to the tube containing the optical fibers.

SUMMARY OF THE INVENTION

It is therefore an object of the present invention to provide an improved composite fiber optic and electrical cable.

It is another object of the present invention to provide a composite fiber optic and electrical cable in which the electrical conductors can be readily connected between a power supply and a signal repeater or other electrical device.

It is a further object of the present invention to provide an improved method for fabricating a composite fiber optic and electrical cable.

These and other objects are provided, according to the present invention, by a composite fiber optic and electrical cable which includes a core containing a number of optical fibers and one or more electrical conductors surrounded by an insulating layer which can be easily stripped from the electrical conductors in order to facilitate connection of the conductors between a power supply and a signal repeater or other electrical device. According to the present invention, the composite cable can also include one or more lengthwise extending strength members which resist tensile forces and prevent buckling of the cable. Further, the composite cable can include an overall protective jacket of various cross-sectional shapes which surrounds the core, the insulated electrical conductors and the strength members.

The electrical conductors of the composite cable of the present invention are preferably wires, such as a solid copper wire or a number of stranded copper wires. Each electrical conductors is also surrounded by an insulating layer preferably made of a polymer material. The insulating layer can include indicia for identifying the polarity of the underlying wire.

According to the present invention, the protective jacket is also made of a polymer material. However, the polymer material from which the protective jacket is made is different than the polymer material forming the insulating layers surrounding the conductors. In particular, the polymer material from which the protective jacket is formed has properties which enable the protective jacket to be stripped away from the insulating layers. By stripping the jacket material away, the electrical conductors, surrounded by the insulating material, are exposed so that they may be connected to a signal repeater, a power source, or other electrical devices. In this regard, the composite cable of the present invention can also include at least one rip-cord located within the protective jacket to facilitate stripping of the jacket longitudinally in order to expose the insulated electrical conductors. The protective jacket can also include indicia on its outer surface to identify the polarity of the underlying electrical conductor.

According to a method aspect of the present invention, the composite fiber optic and electrical cable can be produced by advancing a core containing one or more optical fibers from a storage reel along a path of travel through a jacket extruder. At least one insulated electrical conductor, at least one strength member and at least one rip cord are also advanced along a path of travel through the jacket extruder. The jacket extruder forms a polymer jacket surrounding the core, the electrical conductors, the strength members and the rip cords. The resulting composite cable can have a variety of transverse cross-sectionally shapes, such as circular, elliptical or trilobal, without departing from the spirit and scope of the present invention.

Alternatively, the entire cable can be produced in-line by advancing a number of optical fibers through a buffer tube extruder which forms a loosely fitting buffer tube around the fibers, just prior to advancing the core through the jacket extruder with the electrical conductors, the strength members and the rip cords. The method of the present invention can also include the step of applying a reinforcing layer, such as a layer of steel tape or aramid yarn, to the buffer tube prior to advancing the reinforced core through the jacket extruder if additional strength or protection is desired for the optical fibers disposed within the core.

BRIEF DESCRIPTION OF THE DRAWINGS

Some of the features and advantages of the invention having been described, others will become apparent from the detailed description which follows, and from the accompanying drawings in which:

FIG. 2 is a perspective cross-sectional view of a composite fiber optic and electrical cable of the present invention;

FIG. 3 is a transverse cross-sectional view of the cable taken substantially along the lines 3—3 in FIG. 2;

FIG. 4 is a transverse cross-sectional view of an alternate embodiment of a composite fiber optic and electrical cable according to the present invention;

FIG. 5 is a transverse cross-sectional view of still another alternative embodiment of a composite fiber optic and electrical cable according to the present invention.

DETAILED DESCRIPTION OF THE ILLUSTRATED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1A:
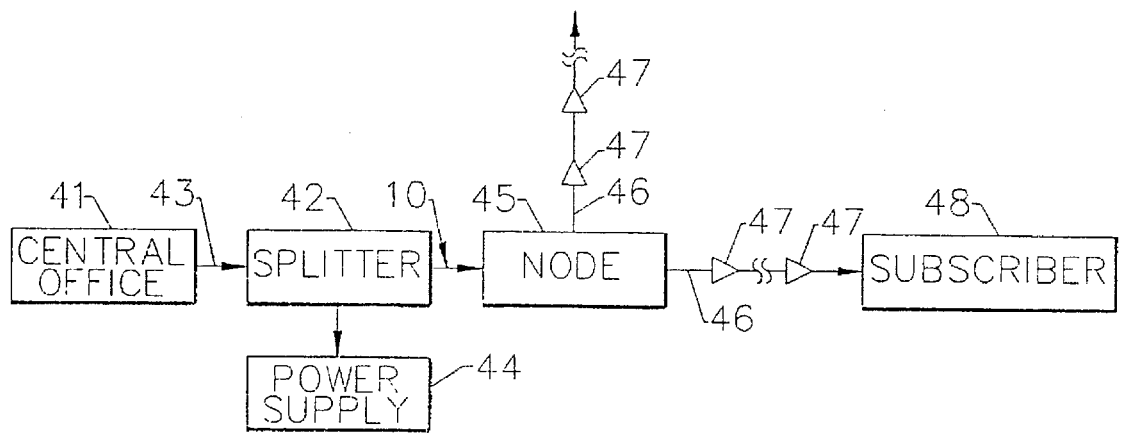
FIG. 1A is a schematic diagram of the composite fiber optic and electrical cable according to the invention used in a first telecommunications network architecture.

A first embodiment of the composite optical and electrical cable of the present invention is indicated generally in FIGS. 1A–3 by the reference character 10. The cable 10 can be employed in many applications requiring the distribution of electrical power along with the transmission of optical signals. For example, as shown in FIG. 1A, the composite cable 10 can be employed in an architecture or telecommunications system 8 including a central office 41 connected to a splitter 42 by a fiber optic trunk cable 43. The telecommunications system can also include a power supply 44 co-located at the splitter location to provide power to the composite cable 10 which, in turn, distributes electrical power to and along coaxial cables 46 to one or more signal repeaters 47. The coaxial cables can also deliver power to the subscriber 48, if desired.

Figure 1B:
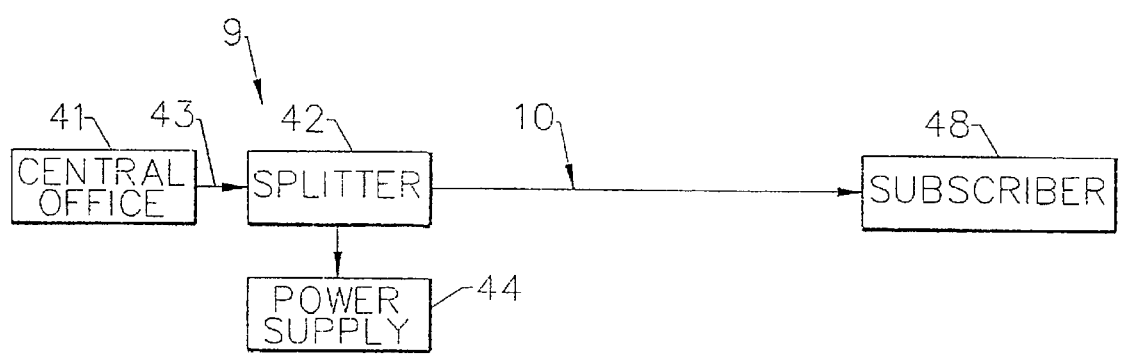
FIG. 1B is a schematic diagram of the composite fiber optic and electrical cable according to the invention used in a second telecommunications network architecture.

As shown in the alternate telecommunications system 9 of FIG. 1B, the composite cable 10 can be connected at one end to a power supply 44 and at the other end directly to the subscriber 48. The other elements of the telecommunications system 9 of FIG. 1B are similar to those of FIG. 1A and, hence, need no further description.

As would be readily understood by those skilled in the art, the power supply 44 is typically a relatively expensive and somewhat large package of electronics. Moreover, the power supply 44 also typically requires a controlled environment. Accordingly, co-locating the power supply 44 at the location of the splitter 42, as provided by the composite optical fiber and electrical cable 10 of the present invention, greatly facilitates the efficient distribution of electrical power to the nodes 45, amplifiers 47, and/or subscribers 48.

As seen in FIGS. 2 and 3, the composite cable 10 of the present invention includes a number of optical fibers 12 surrounded by a loosely fitting core 14. Preferably, the number of optical fibers 12 within the core 14 is twelve or less. However, the composite cable 10 can include any number of optical fibers 12 without departing from the spirit and scope of the present invention. The core 14 in which the optical fibers 12 are loosely disposed includes a buffer tube 15, typically comprised of a polymer. In addition, the core 14 can include an outer reinforcing layer. For example, the outer reinforcing layer of the core 14 can include corrugated steel tape 16 which provides improved protection for the optical fibers 12 against damage, such as by rodents. Alternatively, the outer reinforcing layer of the core 14 can include an outer aramid layer 17 to provide additional strength to the core 14 and to protect the optical fibers 12 from tensile stresses as shown in FIG. 4.

As shown in the illustrated embodiment, the composite cable 10 also includes at least one and, more preferably, a pair of electrically conductive wires 18 and 19 extending longitudinally along diametrically opposite sides of the core 14. While the wires 18 and 19 are shown on diametrically opposite sides of the core 14, those skilled in the art will recognize that the wires 18 and 19 can be disposed, in other embodiments, in other positions relative the core 14 which are not on diametrically opposite sides thereof. However, placement of the electrically conductive wires 18 and 19 on opposite sides of the core 14 can provide improved handling characteristics for the composite cable 10, while still providing sufficient tensile strength and resistance to buckling.

In the illustrated embodiment, the electrically conductive wires 18 and 19 are formed of a material having a relatively low resistance, such as copper. In addition, each of the wires is typically of a relatively large gauge, such as 10, 12 or 14 gauge, and are capable of delivering conventional powering voltages along the cable route, such as, for example, 60 VAC, 85 VDC, 130 VAC, or 135 VDC. Other powering voltages are also contemplated by the invention. In addition, while conductive wires 18 and 19 which are solid are illustrated in FIGS. 2–5, the conductive wires can each be formed of a number of stranded wires which, in combination, comprise the conductive wires.

According to the present invention, the wires 18 and 19 are surrounded by an outer layer of insulation 24. As shown, the outer diameter of the insulating layer 24 surrounding the wires 18 and 19 is preferably less than the overall outside diameter of the core 14. In addition, the insulation layer 24 is typically made of a polymer material such as polyethylene, nylon or other materials, as would be readily understood by those skilled in the art. The insulating layer surrounding each wire 18 and 19 can also have colors or markings different from one another in order to indicate the polarity of each wire. However, one skilled in the art will recognize that the insulating layer 24 surrounding the wires 18 and 19 can be of the same color and need not include any particular indicia.

The composite cable 10 of the present invention also generally includes at least one and, more typically, a pair of lengthwise extending strength members 22. The strength members 22 serve to longitudinally strengthen and stiffen the cable 10. In particular, the strength members 22 prevent the optical fibers 12 disposed within the buffer tube 15 from excessively elongating upon application of tensile loads to the cable 10. In addition, the strength members 22 prevent the optical fibers 12 from buckling or other excessive macrobending upon contraction of various components of the cable 10 at relatively low temperatures. Depending upon the strength of the electrical conductors 18 and 19 and the applications in which the resulting cable 10 will be employed, the electrical conductors may provide sufficient tensile strength to support the cable and to protect the optical fibers 12 disposed within the buffer tube 15 For example, one embodiment of the composite cable 10 described in U.S. patent application Ser. No. 08/258,328 upon which this application is based includes a pair of copper clad steel conductors which serve both to strengthen the cable, thereby protecting the optical fibers, and to conduct power or other electrical signals therealong. However, the composite cable 10 of the present invention preferably includes at least one strength member 22, separate from the electrical conductors 18 and 19, in order to effectively strengthen the cable and to protect the optical fibers 12 disposed within the buffer tube 15 as described above.

According to one embodiment of the present invention, the strength members 22 include a pair of diametrically opposed steel wires disposed adjacent respective ones of the electrical conductors 18 and 19. However, the strength members 22 can be formed of other materials having a tensile strength greater than that of the core 14 so as to effectively strengthen and stiffen the cable 10. In addition, as described above in conjunction with the electrical conductors 18 and 19, the strength members 22 need not be disposed on diametrically opposite sides of the buffer tube 15, but can be disposed in other positions within the cable 10.. In addition, the strength members 22 need not be disposed adjacent respective ones of the electrical conductors 18 and 19, but can be disposed in other positions relative to the electrical conductors. However, placement of the strength members 22 on opposite sides of the core 14 and adjacent respective ones of the electrical conductors 18 and 19 can provide improved handling characteristics for the cable 10.

The strength members 22 can also have various sizes depending upon the relative strength of the material and the desired tensile strength of the resulting composite cable 10. However, the composite cable of one embodiment includes a pair of steel strength members having an outer diameter of between about 1 mm and 1.6 mm and, more particularly, about 1.5 mm.

The core 14, the insulated wires 18 and 19 and the strength members 22 are, in turn, surrounded and encased by a protective jacket 26. As shown in FIGS. 2 and 3, the jacket 26 can have a substantially circular transverse cross-sectional shape. However, the jacket 26 can also have other transverse cross-sectional shapes without departing from the spirit and scope of the present invention as described hereinbelow. The jacket 26 is made of a polymer material having properties which enable it to be readily separated from the insulation layers 24 which surround each of the wires 18 and 19. To this end, the polymer material of the jacket 26 preferably forms a distinct mechanically separate phase from the polymer material of the insulation layer 24.

This phase separation is accomplished by appropriate selection of the polymeric composition of the insulation layer 24 and the jacket 26, such as by selecting a polymer material for the jacket 26 which has a melting temperature which is lower than the melting temperature of the polymer material forming the insulation layers 24. For example, if the jacket 26 is made of polyethylene, the insulation layers 24 can be made of a material having a higher melting temperature, such as a higher-melting grade of polyethylene, a nylon, or a polyester such as polyethylene terephthalate (PET) or polybutylene terephthalate (PBT). Because the jacket 26 has a lower melting temperature than the insulation layers 24, the insulation does not melt or bond with the jacket 26 when the jacket is formed around the insulation.

The protective jacket 26 can therefore be readily stripped away from the insulation layers 24 during installation of the cable 10, thereby exposing the insulated wires 18 and 19 so that they can be connected to a power supply 44 (FIGS. 1A and 1B) or other electrical devices.

As shown in FIG. 2, the jacket 26 of one embodiment includes markings, such as a contrasting stripe 27, on its outer surface for indicating the polarity of the underlying wires 18 and 19. Preferably, the markings on the jacket are disposed in a predetermined positional relationship to an underlying wire so that a technician can readily locate the underlying wire. However, one skilled in the art will recognize that the jacket 26 need not include any markings indicating polarity of the underlying wires 18 and 19.

The composite optical and electrical cable 10 of the present invention can also include at least one rip cord and, more typically, a pair of rip cords 28 and 29 disposed longitudinally within the jacket 26. As illustrated, the first rip cord 28 is preferably located along a longitudinal line adjacent both the core 14 and the insulation layer 24 surrounding the first wire 18. Likewise, the second rip cord 29 is preferably located along a longitudinal line adjacent both the core 14 and the insulation layer 24 surrounding the second wire 19. Consequently, the rip cords 28 and 29, when pulled back from a cut end of the cable 10, will rip the jacket 26 longitudinally to expose the core 14 and the insulation 24 surrounding wires 18 and 19, thereby enabling a field technician to connect the wires 18 and 19 to a power supply 44 or other device requiring power.

One skilled in the art will recognize, however, that the cable 10 of the present invention can have none or any number of rip-cords 28 and 29, and that the rip-cords can be disposed within the jacket 26 at positions other than those described without departing from the spirit and scope of the present invention. Alternatively, in embodiments of the composite cable 10 in which the strength members 22 have a relatively small cross-sectional diameter, such as less than about 1.0 mm for an elongate steel strength member, the strength members can serve as rip-cords to rip the jacket 26 longitudinally to expose the core 14 and the insulation 24 surrounding the wires 18 and 19, thereby also facilitating the connection of the wires with any number of electrical devices.

Another embodiment of the composite optical and electrical cable 30 of the present invention is illustrated in FIG. 4 in which the composite optical and electrical cable has a substantially elliptical transverse cross-sectional shape. Again, the cable 30 includes a number of optical fibers 12 surrounded loosely by a core 14. As shown, the core 14 is preferably centered at the intersection of the major axis and the minor axis of the elliptical cross-section of the cable 30. The core 14 of this embodiment of the composite cable includes an inner polymer buffer tube 15 and an outer reinforcing layer of aramid yarn 17. Like the embodiment of FIGS. 2 and 3, the core 14 can alternatively have a reinforcing layer of corrugated steel tape 16, or the core may have no reinforcing layer so as to be formed only of a polymer buffer tube 15.

The cable 30 of this embodiment also includes at least one and, more typically, two conductive wires 18 and 19, preferably located on diametrically opposite sides of the core 14. As described above in conjunction with FIGS. 2 and 3, the wires 18 and 19 are also surrounded by a respective insulating layer 24 which has an overall outside diameter which is typically less than the outside diameter of the core 14. As described above, the insulation layer 24 surrounding the electrical conductors 18 and 19 can include indicia for indicating the polarity of the conductors, and the protective jacket 26 can also include indicia on its outer surface for indicating the polarity of an underlying electrical conductor.

The cable 30 of the embodiment of FIG. 4 also includes at least one and, more preferably, a pair of strength members 22. In addition, the composite cable can include two rip cords 28 and 29. Again, the first rip cord 28 is preferably located along a longitudinal line adjacent the core 14 and the insulation layer 24 surrounding the first wire 18, and the second rip cord 29 is preferably located along a longitudinal line adjacent the core 14 and the insulation layer 24 surrounding the second wire 19. One skilled in the art will again recognize, however, that the cable 30 of the present invention can have none or any number of rip-cords, and that the rip-cords can be disposed within the jacket 26 at positions other than those described without departing from the spirit and scope of the present invention.

As illustrated in FIG. 4, each strength member 22 is preferably disposed adjacent a respective conductive wire as described in conjunction with the embodiment of the composite cable 10 of FIGS. 2 and 3. In addition, the respective centers of the adjacent strength member and conductive wire are preferably located on opposite sides of the major axis of the elliptical cross section of the cable 30. However, the strength members 22 and the conductive wires 18 and 19 can be disposed in other positions relative to one another and relative to the major axis of the elliptical cross section of the cable 30 without departing from the spirit and scope of the present invention.

Another embodiment of the composite optical and electrical cable of the present invention is shown in FIG. 5 and indicated generally by reference numeral 40. The composite cable 40 of this embodiment also preferably includes a pair of insulated conductors 18 and 19 and a pair of strength members 22. In addition, the insulation layers 24 surrounding wires 18 and 19 again have an overall outside diameter which is preferably less than the outer diameter of the core 14. In addition, the insulated conductors and the strength members are generally located on diametrically opposite sides of the core 14 and each strength member is preferably disposed adjacent a respective insulated conductor to facilitate the handling characteristics of the cable 40. However, the composite cable of this embodiment can include any number of insulated conductors and/or strength members and the insulated conductors and the strength members can be disposed in other positions without departing from the spirit and scope of the present invention. According to this embodiment of the present invention, however, the jacket 26, which surrounds and encases the core 14, the strength members 22 and the insulation layers 24 surrounding the wires 18 and 19, preferably has a thickness which is consistent about the transverse perimeter of the cable 40, thus causing the cable 40 to have a transverse cross-sectional configuration which is trilobal.

As with the previously described embodiments of the composite cable, the composite cable 40 illustrated by FIG. 5 typically includes two rip cords 28 and 29 disposed longitudinally within the cable and adjacent the core 14 and the insulation layers 24 surrounding the electrical conductors 18 and 19. One skilled in the art will again recognize, however, that the cable 40 of the present invention can have none or any number of rip-cords, and that the rip-cords can be disposed within the jacket 26 at positions other than those described without departing from the spirit and scope of the present invention. Additionally, the insulation layers 24 surrounding the electrical conductors 18 and 19 can have indicia for indicating polarity of the electrical conductors, and the jacket 26 can have indicia on its outer surface for indicating polarity of the underlying conductors.

Figure 6:
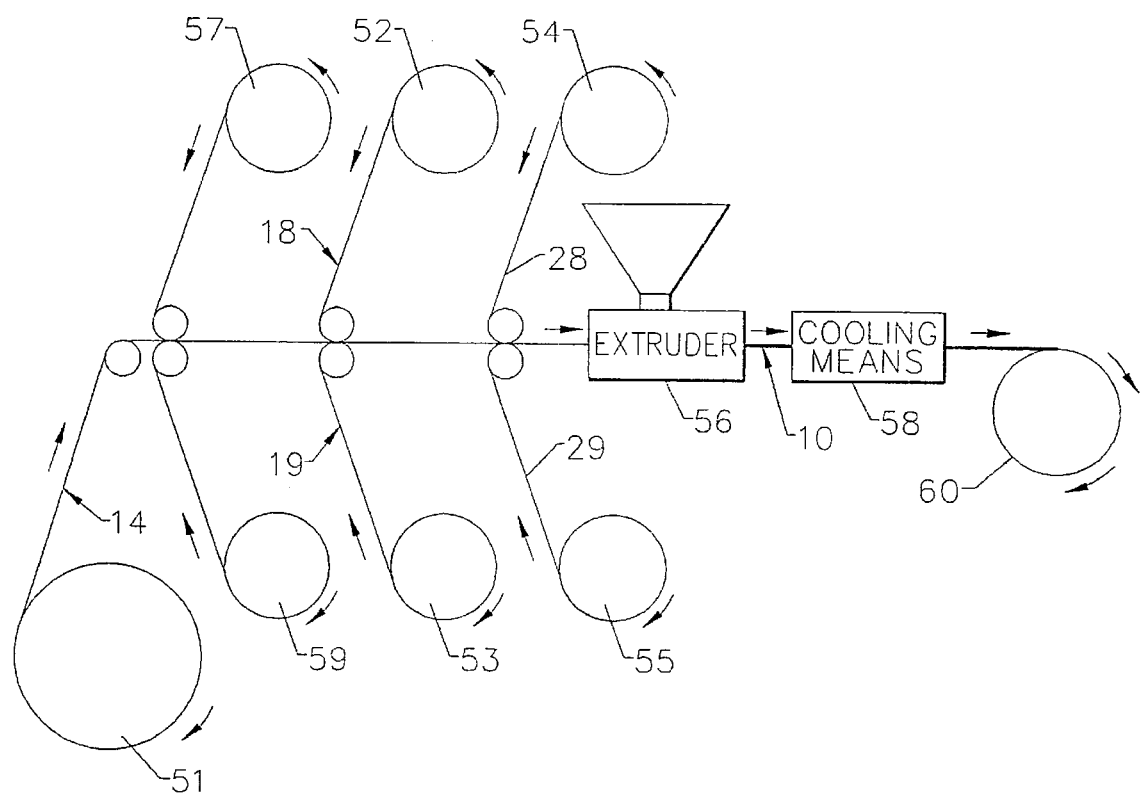
FIG. 6 is a schematic view illustrating a manufacturing line for making composite optical and electrical cables of the present invention.

A preferred method of producing the composite fiber optic and electrical cable 10 of the present invention is illustrated schematically in FIG. 6. According to this method, a core 14 is provided on a storage reel 51, and is advanced from the storage reel along a path of travel through a jacket extruder 56. At least one and, more typically, two electrical conductors 18 and 19, such as copper conductors, which are surrounded by an outer layer of polymer insulating material, are advanced from storage reels 52 and 53 along a path of travel through the jacket extruder 56 adjacent the core 14. Typically, the electrical conductors are advanced along diametrically opposite sides of the core 14 as described above, however, the electrical conductors can be advanced in other relative positions without departing from the spirit and scope of the present invention.

According to one advantageous embodiment, at least one and, more typically, two rip cords 28 and 29 are also advanced from storage reels 54 and 55 along a path of travel through the jacket extruder 56 adjacent the core 14 and the electrical conductors 18 and 19. In addition, at least one and, more typically, two strength members 22 are advanced from storage reels 57 and 59 along a path of travel through the jacket extruder 56. As described above, the strength members 22 are typically advanced adjacent the core and respective ones of the electrical conductors 18 and 19. While the illustrated method includes the advancement of a pair of electrical conductors 18 and 19, a pair of rip cords 28 and 29 and a pair of strength members 22 along a path of travel through the jacket extruder 56, any number of electrical conductors, rip cords or strength members can be advanced from respective storage reels along a path of travel through the jacket extruder without departing from the spirit and scope of the present invention.

The jacket extruder 56 forms a molten polymer jacket 26 surrounding and encasing the core 14, the electrical conductors 18 and 19, the strength members 22 and the rip cords 28 and 29 so as to form a composite cable 10. The jacket 26 formed by the jacket extruder 56 can have a variety of transverse cross-sections such as circular, elliptical or trilobal as illustrated in FIGS. 3, 4 and 5, respectively. Also, according to this method, the insulating material of the electrical conductors 18 and 19 can include indicia for indicating a polarity of the electrical conductors, and the jacket 26 can include indicia placed on its outer surface for indicating a polarity of an underlying electrical conductor, if desired.

According to a preferred embodiment of the present invention, the molten polymer extruded by the jacket extruder 56 has a melting temperature which is lower than the melting temperature of the polymer insulating material 24 surrounding the electrical conductors 18 and 19. Thus, the insulating material 24 does not melt upon contacting the molten jacket material in the jacket extruder 56, and it does not bond to the jacket material as the jacket material cools and solidifies.

After the jacket 26 has been extruded around the core 14, electrical conductors 18 and 19, strength members 22 and rip cords 28 and 29, the cable 10 is advanced through a cooling unit 58 and is then wound about a take-up reel 60. One skilled in the art will recognize that instead of being wound about a take-up reel 60, the cable 10 can continue along the path of travel for further processing.

In another preferred method of producing the composite fiber optic and electrical cable 10 of the present invention, a number of optical fibers 12, typically twelve or less, are provided from respective fiber payoffs and are advanced along a path of travel to a first extruder which extrudes a loose fitting buffer tube 15 around the fibers. A reinforcing layer of corrugated steel tape or aramid yarn can then be applied to the buffer tube to form a core 14. The core 14 is then advanced through the jacket extruder 56 along with the electrical conductors 18 and 19, the strength members 22 and the rip-cords 28 and 29, as set forth above. Again, after being cooled, the cable 10 can be wound about a take-up reel 60 or can continue on the path of travel for further processing.

Therefore, the composite fiber optic and electrical cable 10 of the present invention includes a core 14 having a number of optical fibers 12 loosely confined within a buffer tube 15, one or more insulated electrical conductors 18 and 19, and one or more strength members 22 surrounded by a protective jacket 26. By properly selecting the polymeric materials from which the protective jacket 26 and the insulating layers 24 surrounding the electrical conductors 18 and 19 are formed, the polymer materials forming the jacket and the insulating layers can remain in mechanically separable phases such that the protective jacket can be readily separated from the insulation layers which surrounds each of the electrical conductors. Accordingly, the electrical conductors 18 and 19 can be readily connected with power supplies, signal repeaters, or other electrical devices.

In the drawings and specification, there has been set forth preferred embodiments of the invention, and although specific terms are employed, they are used in a generic and descriptive sense only and not for purposes of limitation.

What is claimed is:

1. A composite fiber optic and electrical cable comprising:
   an elongate core,
   at least one optical fiber extending longitudinally within said core,
   at least one electrical power conductor extending longitudinally of and alongside said core,
   an insulating layer of a first polymer material surrounding each electrical power conductor,
   at least one strength member extending longitudinally of and alongside said core, and
   an outer protective jacket of a second polymer material surrounding and encasing said core, said at least one strength member and said insulating layer of each electrical power conductor, said protective jacket having properties enabling said outer jacket to be separated from said insulating layers, wherein said second polymer material is of a composition which forms a distinct mechanically separate phase from said first polymer material.

2. A composite fiber optic and electrical cable according to claim 1 wherein said second polymer material has a melting temperature lower than the melting temperature of said first polymer material.

3. A composite fiber optic and electrical cable according to claim 2 wherein said first polymer material is polyester and said second polymer material is polyethylene.

4. A composite fiber optic and electrical cable according to claim 1 wherein said at least one electrical power conductor comprises a pair of electrical power conductors disposed on diametrically opposed sides of said elongate core.

5. A composite fiber optic and electrical cable according to claim 1 wherein said at least one electrical power conductor comprises an elongate solid copper wire.

6. A composite fiber optic and electrical cable according to claim 1 wherein said at least one electrical power conductor comprises a plurality of stranded copper wires.

7. A composite fiber optic and electrical cable according to claim 1 wherein said at least one strength member comprises a pair of strength members disposed on diametrically opposed sides of said elongate core.

8. A composite fiber optic and electrical cable according to claim 1 wherein said at least one strength member comprises an elongate steel wire.

9. A composite fiber optic and electrical cable according to claim 1 wherein said core comprises at least one buffer tube and a reinforcing layer surrounding said at least one buffer tube.

10. A composite fiber optic and electrical cable according to claim 1 wherein a transverse cross-section of said cable is substantially circular in shape.

11. A composite fiber optic and electrical cable according to claim 1 wherein said insulating layer surrounding each electrical power conductor has an overall outside diameter less than the outer diameter of said core.

12. A composite fiber optic and electrical cable according to claim 1 wherein a transverse cross-section of said cable is substantially elliptical in shape.

13. A composite fiber optic and electrical cable according to claim 1 wherein a transverse cross section of said cable is substantially trilobal in shape.

14. A composite fiber optic and electrical cable according to claim 1 further comprising at least one rip-cord extending longitudinally within said protective jacket, and wherein said at least one rip-cord is adapted to facilitate removal of said protective jacket from said insulation layer.

15. A composite fiber optic and electrical cable according to claim 1 wherein at least one of said insulating layers includes indicia for indicating a polarity of the electrical power conductor surrounded by said insulating layer.

16. A composite fiber optic and electrical cable according to claim 1 further comprising marking indicia on the outer surface of said outer jacket for indicating a polarity of an electrical power conductor located within said cable in a predetermined positional relationship to said marking indicia.

17. A composite fiber optic and electrical cable comprising:
   at least one optical fiber,
   an elongate buffer tube loosely surrounding said at least one optical fiber to thereby from an elongate core,
   at least one electrical power conductor extending longitudinally of and alongside said core,
   an insulating layer of a first polymer material individually surrounding each electrical power conductor,
   at least one strength member extending longitudinally of and alongside said core, and
   an outer protective jacket of a second polymer material surrounding and encasing said core, said at least one strength member and said insulating layer of each electrical power conductor, said second polymer material having a melting temperature lower than the melting temperature of said first polymer material, and said second polymer material forming a distinct separate phase from said first polymer material to thereby facilitate separation of said outer jacket from said insulating layer of each electrical power conductor.

18. A composite fiber optic and electrical cable according to claim 17 wherein said insulating layer surrounding each electrical power conductor has an overall outside diameter less than the outside diameter of said core.

19. A composite fiber optic and electrical cable according to claim 17 wherein said first polymer material is polyester and said second polymer material is polyethylene.

20. A composite fiber optic and electrical cable according to claim 17 wherein said at least one electrical power conductor comprises a pair of electrical power conductors disposed in diametrically opposed sides of said core.

21. A composite fiber optic and electrical cable according to claim 17 wherein said at least one electrical power conductor comprises an elongate solid copper wire.

22. A composite fiber optic and electrical cable according to claim 17 wherein said at least one electrical power conductor comprises a plurality of stranded copper wires.

23. A composite fiber optic and electrical cable according to claim 17 wherein said at least one strength member comprises a pair of strength members disposed on diametrically opposed sides of said elongate core.

24. A composite fiber optic and electrical cable according to claim 17 wherein said at least one strength member comprises an elongate steel wire.

25. A method of producing a composite fiber optic and electrical cable comprising:

advancing a core, containing within it at least one optical fiber, along a path of travel, advancing at least one power conductor, surrounded by an insulating layer made of a first polymer material, along a path of travel adjacent to said path of travel of the core, advancing at least one strength member along a path of travel adjacent to said path of travel of the core, and extruding an outer protective jacket around said core, said at least one power conductor and said at least one strength member such that the outer jacket surrounds and encases each conductor and each strength member, wherein the outer jacket is made of a second polymer material having properties enabling said outer jacket to be separated from said insulating layers, and wherein the second polymer material is of a composition which forms a distinct mechanically separate phase from the first polymer material.

26. A method according to claim 25 wherein said step of extruding an outer protective jacket comprises extruding the outer jacket from a second polymer material having a melting temperature which is lower than the melting temperature of the first polymer material.

27. A method according to claim 25 wherein said step of advancing at least one power conductor comprises the steps of:

advancing a pair of power conductors along respective paths of travel adjacent to said path of travel of the core, and directing the pair of advancing power conductors on diametrically opposed sides of the core.

28. A method according to claim 25 wherein said step of advancing at least one strength member comprises the steps of:

advancing a pair of strength members along respective paths of travel adjacent to said path of travel of the core, and directing the pair of advancing strength members on diametrically opposed sides of the core.

29. A method according to claim 25 further comprising the steps of advancing at least one rip-cord along a path of travel adjacent to the respective paths of travel of the core and the at least one power conductor, and wherein said step of extruding an outer protective jacket also includes extruding the outer protective jacket around said at least one rip-cord.

30. A method according to claim 25 wherein said step of extruding an outer protective jacket further comprises placing marking indicia on the outer surface of said outer jacket at a location in a predetermined positioned relationship to an electrical conductor to indicate a polarity of the electrical conductor.

31. A method according to claim 25 further comprising, prior to the step of advancing said core along a path of travel, the steps of:

advancing at least one optical fiber along a path of travel, and forming a loosely fitting core around the at least one advancing fiber.

32. A method according to claim 31 wherein said step of forming a loosely fitting core around the at least one advancing fiber comprises extruding a buffer tube thereabout.

33. A method according to claim 32 wherein said step of forming a loosely fitting core further comprises applying an outer reinforcing layer to the buffer tube.

* * * * *